(12) United States Patent
Vega

(10) Patent No.: US 6,362,738 B1
(45) Date of Patent: Mar. 26, 2002

(54) READER FOR USE IN A RADIO FREQUENCY IDENTIFICATION SYSTEM AND METHOD THEREOF

(75) Inventor: Victor Vega, Hercules, CA (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/391,725

(22) Filed: Sep. 8, 1999

Related U.S. Application Data (63) Continuation-in-part of application No. 09/061,146, filed on Apr. 16, 1998.
(60) Provisional application No. 60/099,985, filed on Sep. 11, 1998.

(51) Int. Cl.[7] ................................................ G08B 13/14
(52) U.S. Cl. ........................ 340/572.1; 340/572.7; 340/568.1; 340/10.1; 340/10.51
(58) Field of Search ................... 340/572.1, 572.7, 340/568.1, 539, 10.1, 10.4, 10.51, 10.52, 10.3, 10.41, 825.06, 572.8; 342/429, 445; 343/751, 777, 853, 894; 235/435–453

(56) References Cited

U.S. PATENT DOCUMENTS 3,843,036 A    10/1974   Monahan et al. ............. 228/6.2
4,667,185 A *   5/1987   Nourse et al. ............ 340/572.1
4,742,470 A     5/1988   Juengel (List continued on next page.)

FOREIGN PATENT DOCUMENTS

DE   40 17 934 C2   1/1992
EP   0 245 196 A2   11/1987
EP   0 260 221 A3   3/1988
EP   0 260 221 A2   3/1988

*Primary Examiner*—Daniel J. Wu
*Assistant Examiner*—Toan Pham
(74) *Attorney, Agent, or Firm*—Terri S. Hughes (57) ABSTRACT

A contactless programmable electrostatic Radio Frequency Identification (RFID) reader that also serves as an Electronic Article Surveillance (EAS) reader is described. The RFID/EAS reader contains a detector circuit for detecting the presence of a signal carrier frequency transmitted by the transponder in response to a signal from the reader. The detector circuit has a resonator circuit which is connected to a receiver electrode. The resonator comprises a piezoelectric element with a high quality factor 'Q' at the resonant frequency to enhance sensitivity. The alarm carrier signal is rectified and fed to either a peak detector or an envelope detector circuit. A voltage source generates a voltage threshold to allow for operating range adjustment. A comparator compares both voltages and generates an alarm signal if the voltage signal reaches the threshold voltage. The RFID/EAS further having the capability to read the RFID contents. Alternatively, an electrostatic EAS reader (without RFID capability) having a substantially similar detector circuit is also described.

23 Claims, 4 Drawing Sheets

U.S. PATENT DOCUMENTS

| | | | |
|---|---|---|---|
| 4,783,646 A | 11/1988 | Matsuzaki | 340/572.5 |
| 4,818,855 A | 4/1989 | Mongeon et al. | |
| 4,900,386 A | 2/1990 | Richter-Jorgensen | 514/419 |
| 4,970,495 A | 11/1990 | Matsumoto et al. | 340/572.1 |
| 5,081,445 A | 1/1992 | Gill et al. | 340/572.1 |
| 5,175,418 A | 12/1992 | Tanaka | 235/439 |
| 5,288,235 A | 2/1994 | Sobhani | 439/67 |
| 5,353,011 A * | 10/1994 | Wheeler et al. | 340/572.1 |
| 5,430,441 A | 7/1995 | Bickley et al. | 340/10.2 |
| 5,451,958 A * | 9/1995 | Schuermann | 342/42 |
| 5,481,229 A | 1/1996 | Connell et al. | |
| 5,528,222 A | 6/1996 | Moskowitz et al. | 340/572.1 |
| 5,566,441 A | 10/1996 | Marsh et al. | 29/600 |
| 5,661,457 A * | 8/1997 | Ghaffari et al. | 340/572.1 |
| 5,682,143 A | 10/1997 | Brady et al. | 340/572.7 |
| 5,710,458 A | 1/1998 | Iwaski | 257/679 |
| 5,781,111 A | 7/1998 | Easter et al. | |
| 5,786,626 A | 7/1998 | Brady et al. | 257/673 |
| 5,847,447 A | 12/1998 | Rozin et al. | 257/678 |
| 5,850,187 A | 12/1998 | Carrender et al. | 340/10.6 |
| 5,854,480 A | 12/1998 | Noto | 235/492 |
| 5,874,896 A * | 2/1999 | Lowe et al. | 340/572.1 |
| 5,942,978 A * | 8/1999 | Shafer | 340/572.9 |
| 5,955,951 A | 9/1999 | Wischerop et al. | |
| 6,001,211 A | 12/1999 | Hiroyuki | 156/277 |
| 6,040,773 A * | 3/2000 | Vega et al. | 340/572.1 |
| 6,104,285 A * | 8/2000 | Stobbe | 340/505 |
| 6,122,492 A | 9/2000 | Sears | |

* cited by examiner

READER FOR USE IN A RADIO FREQUENCY IDENTIFICATION SYSTEM AND METHOD THEREOF

This application is a C-I-P of Ser. No. 09/061,146 filed Apr. 16, 1998 and also claims benefit of Prov. No, 60/099,985 filed Sep. 11, 1998.

FIELD OF THE INVENTION

The invention generally relates to Radio Frequency Identification (RFID) technology, and more particularly relates to contactless programmable electrostatic RFID technology.

CROSS REFERENCE TO RELATED APPLICATIONS

This is a continuation in part of a prior U.S. patent application Ser. No. 09/061,146, filed Apr. 16, 1998 by inventors Ted Geiszler et al, Attorney Docket No. IND00701P01, entitled "REMOTELY POWERED ELECTRONIC TAG WITH PLURAL ELECTROSTATIC ANTENNAS AND ASSOCIATED EXCITER/READER AND RELATED METHOD; RADIO FREQUENCY IDENTIFICATION TAG SYSTEM USING TAGS ARRANGED FOR COUPLING TO GROUND; RADIO FREQUENCY IDENTIFICATION TAG ARRANGED FOR MAGNETICALLY STORING TAG STATE INFORMATION; AND RADIO FREQUENCY IDENTIFICATION TAG WITH A PROGRAMMABLE CIRCUIT STATE" and assigned to Motorola, Inc. the disclosure of which prior application is hereby incorporated by reference, verbatim and with the same effect as though it were fully and completely set forth herein.

BACKGROUND OF THE INVENTION

Radio Frequency Identification (RFID) technology allows identification data to be transferred remotely which provides a significant advantage in identifying persons, articles, parcels, and others. In general, to access identification data stored in a RFID transponder (a.k.a. a tag) remotely, a RFID reader/encoder generates an energy field to activate the RFID transponder and subsequently to retrieve data stored in the transponder unit from a distance. The data retrieved is then processed by a host computer system to identify the person or article that is associated with the transponder. While a transponder that derives its power from the energy field is known as a passive transponder, a transponder that has its own power source is known as an active transponder. RFID technology has found a wide range of applications including tracking, access control, theft prevention, security, etc.

For some applications, RFID technology is more preferable than magnetic strip technology, which also finds applications in a few of the areas above. The reason is systems employing RFID technology can store a lot more information than magnetic strip technology. Magnetic strip technology as commonly deployed has very limited memory capability. Moreover, magnetic strip technology requires relatively high maintenance (e.g., heads cleaning). Furthermore, magnetic strip technology is prone to moisture damages, dust damages, magnetic field damages, etc.

RFID technology should be distinguished from Radio ID technology which uses ordinary radio waves, or more precisely far field electromagnetic (EM) waves which are also known as radiation waves. Far field means the distance between the transceiver and transponder is great compared to the wavelength of the EM carrier signal used. An example of Radio ID technology is the Identify Friend or Foe (IFF) systems used with military aircraft. Far field EM waves have a field strength that varies inversely with the distance involved.

In contrast, conventional RFID technology is based upon inductive coupling utilizing magnetic field waves. Conventional RFID technology operates in the near field where the operating distance is far less than one wavelength of the EM field. Unlike far field radio waves, the magnetic field strength is approximately proportional to the inverse cube of the distance from the source. In inductance-based RFID technology, an electromagnetic field is generated for use both as a power source for the transponder and for transferring data and clock information between the reader/encoder and transponder. Magnetic fields are generated by causing RF alternating current to flow in coils that typically have multiple turns. However, it is often difficult to integrate the coils in an integrated circuit. Generally, these coils are required to be wire wound or etched metal. This requirement adversely impacts the costs, manufacturability, and packaging flexibility of inductance-based RFID technology. Due to the prohibitive costs and high degree of manufacturing difficulty, electromagnetic RFID technology is not practical in high volume/low cost disposable applications. The bulky packaging, which is typical for electromagnetic RFID technology, further limits its application to those where thickness is not of primary importance.

In general, an Electronic Article Surveillance. (EAS) system is designed to prevent article thefts and is widely used in retail stores as well as libraries. An EAS system is typically implemented using magnetic strip technology wherein a magnetic strip is inserted into or attached to an article. Operationally, an EAS reader/detector constantly transmits a RF activation signal. When the magnetic strip receives the RF activation signal, it becomes activated and sends back the stored information. Accordingly, unless the magnetic strip has been removed from the article or deactivated by the attendant, it triggers the reader/detector to sound an alarm, which alerts the attendant of a potential theft. In designing an EAS system, operating range and responsiveness (i.e., read time) are the two primary considerations. Operating range is important to accommodate the vast differences in sizes of parcels, baggage, etc. Operating responsiveness is important because a person attempting to illegally remove an article from a secured area will not likely pause when passing through the sensing area of the surveillance system to allow the EAS system time to read the surveillance tag. While magnetic strip based EAS systems provide adequate read time and operating range, the stored authorization information can be erased if the magnetic strip is subject to external magnetic fields. Hence, magnetic strip based EAS systems are limited in their applications. Conventional RFID systems are too expensive, bulky, and limited in operating range to be used in EAS applications. Moreover, conventional RFID systems generally have a relatively low Quality (hereinafter 'Q') factor (e.g., in the 10's) and therefore low detection sensitivity. Accordingly, conventional RFID systems are currently not suitable for EAS applications. Furthermore, due to the amount of data information transfer involved, the read time of conventional RFID systems is also not suitable for EAS applications.

Thus, a need exists for a RFID apparatus, system, and method having the operating range, responsiveness, robustness, and sensitivity required for EAS applications that is also inexpensive, compact, and easy to implement.

SUMMARY OF THE INVENTION

Accordingly, the present invention provides an apparatus, system, and method having the operating range, responsiveness, robustness, and sensitivity required for EAS applications that is also inexpensive, compact, and easy to implement.

The present invention meets the above needs with an enhanced range combined Radio-Frequency Identification (RFID)/Electronic Article Surveillance (EAS) reader functioning as a base station. The reader is capable of contactless bidirectional data transfer based on radio-frequency electrostatic fields rather than on electromagnetic fields for a substantial cost advantage. The reader generates an electrostatic field between two pads, called "electrodes", for transmission of write/read signals to the transponder. The transponder receives the write/read signal and transmits back information via its two electrodes. This invention can be used for theft prevention as an additional benefit of an RFID system already installed for merchandising. The reader includes a detector circuit for detecting the presence of a signal carrier frequency transmitted by the transponder in response to a signal from the reader. The detector circuit comprises a piezoelectric resonator circuit which is coupled to a receiver electrode. The piezoelectric resonator circuit is employed for its high sensitivity characteristics due to its high quality factor 'Q' at resonance. The high sensitivity is used to detect EAS transponder signals thereby setting an alarm. In an alternate embodiment, the reader also includes the ability to write to or read electrostatic RFID transponders.

In an example application, disposable transponders are attached to merchandise and removed or deactivated at its purchase. A customer walking past the reader with an active EAS transponder causes the transponder to send its carrier signal. This signal is detected over an extended range and is used to trigger an alert. Since RFID systems are used already for inventory tracking of merchandise, the invention is a means for economical theft prevention.

An advantage of the invention is the use of an RFID system already installed for merchandising for the additional benefit of theft prevention.

Another advantage of the invention is the ability to detect single-bit EAS transponders.

Another advantage of the invention is the ability to detect RFID/EAS transponders, also used for multiple-bit, article identification.

Another advantage of the invention is the minor addition of the detector circuit to the reader resulting in detection of a transponder carrier frequency at an extended and an adjustable range.

Another advantage of the invention is decreased component and assembly cost for detection circuit by the use of a piezoelectric element.

Another advantage of the invention is improved sensitivity, sufficient robustness, and improved read time that are required for EAS applications.

Another advantage of the invention is savings in reader power and weight, thus facilitating battery operated readers for programming, reading and detecting transponders (tags) in the field, e.g. in warehouse inventory management and theft prevention.

Another advantage of the invention is an increased detection range without violating FCC regulations and EMI regulations.

DETAILED DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application to passive transponders (i.e., without its own power source), it is to be appreciated that the present invention is also applicable to active transponders (i.e., with its own power source).

A detailed description of the electrostatic RFID/EAS system invented by the applicant is provided below. The object of this invention is to provide an enhanced EAS detection range for the electrostatic Radio-Frequency Identification (RFID)/Electronic Article Surveillance (EAS) system (i.e., between a reader and a transponder) by adding a detection circuit to the reader for detecting the transponder signal carrier frequency. This detection circuit is used for theft prevention or EAS as an additional benefit of an RFID system used for merchandising. Disposable transponders are attached to merchandise and removed or deactivated at its purchase. A customer walking past the reader with an intact transponder causes the transponder to send its signal carrier signal. This signal is detected over an extended range and is used to trigger an alert. In short, the RFID/EAS reader can function in both RFID mode and EAS mode. In RFID mode, data information stored in the transponder's memory is sent to the reader. In EAS mode, an alarm signal is sent to the reader. As an alternate embodiment, an electrostatic EAS system implementing the present invention for providing an enhanced EAS detection range is also described below.

Figure 1:
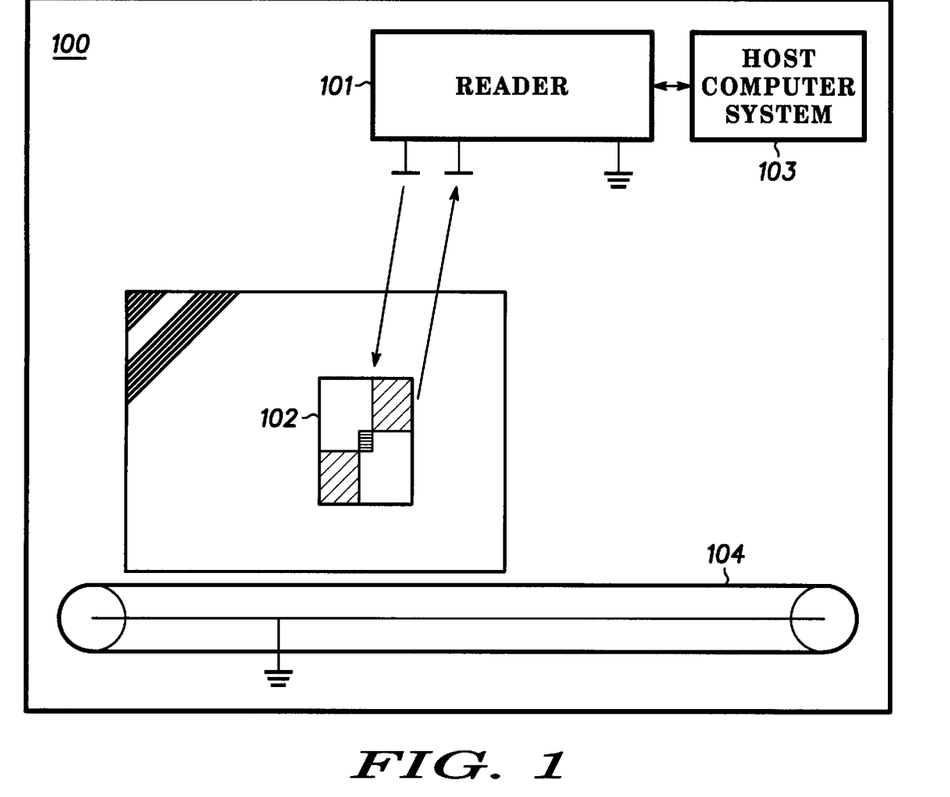
FIG. 1 is a diagram illustrating a typical electrostatic RFID system implementing the present invention.

The present invention relates to an enhanced range electrostatic Radio-Frequency Identification (RFID) System 100, as depicted in FIG. 1, comprising a transceiving reader/encoder 101 (hereinafter called "reader") and a transponder 102. Reader 101 serves as a base station for transponders 102 which may be disposable. In one embodiment, the reader may also be connected to host computer 103 which may store a database. Alternatively, the reader may be connected to an audio alarm or a visual alarm (e.g., Light Emitting Diodes (LED)). The contactless data transfer is based on radio-frequency electric (in the following called "electrostatic") fields rather than on electromagnetic fields for substantial cost and size advantages. A detailed description of the RFID system invented by the applicant is provided below. The object of this invention is the detection of a carrier frequency transmitted by a transponder, an improvement in the communication range between reader and transponder.

Figure 2:
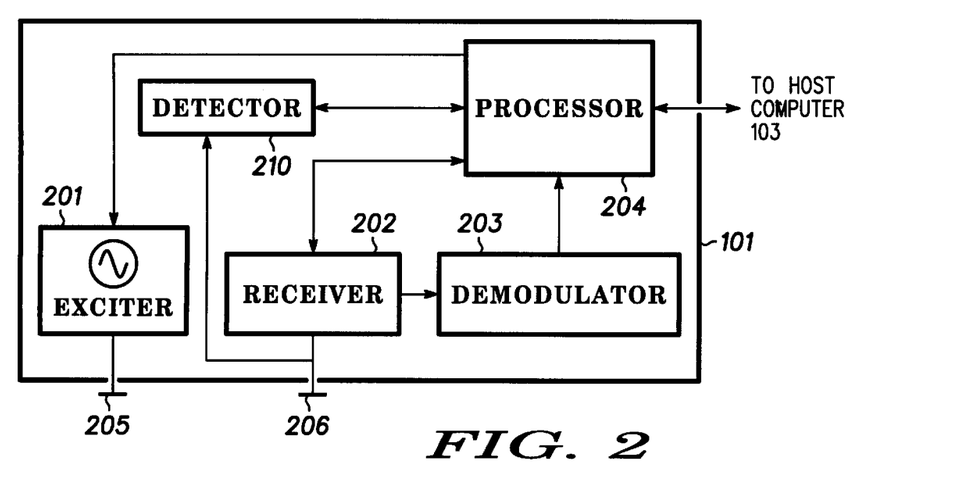
FIG. 2 is a block diagram of the RFID/EAS reader illustrated in FIG. 1.

FIG. 2 depicts, as an example, electrostatic reader 101 which is operated by an optional processor 204 connected to an optional host computer 103 storing a database. Processor 204 initiates write (data programming) or read (query) operations to transponder 102 by first causing exciter 201 to generate an electrostatic RF field between two conductive plates (in the following called "electrodes") 205, one of which may be grounded. The electrostatic field allows exciter signals to be transmitted to power and activate transponder 102. Generating an electrostatic field between two floating electrodes is called "dipole operation". Conversely, generating an electrostatic field between an electrode and a virtual ground electrode is called "monopole operation". A virtual ground means a low impedance capacitive coupling at the operating frequency to ground.

Other parts of reader 101 include receiver 202 which receives RF signal from transponder 102 via receiver electrodes 206. A read signal received is then sent to demodulator 203 which demodulates the signal before passing it on to processor 204. In general, transponder 102 transmits a read signal to reader 101 in response to an exciter signal from reader 101. In other words, data transfer between reader 101 and transponder 102 is established through capacitive coupling between the reader electrodes and the transponder electrodes with the air space in between forming the dielectric medium. The exciter signal transmitted from reader 101 has an exciter (carrier) frequency of 125 kHz. Conversely, the read signal received from transponder 102 has a carrier frequency of 62.5 kHz. It should be clear to a person of ordinary skill in the art that other carrier frequencies can also be used. The exciter frequency is used as a master clock signal for transponder 102. Transponder 102 generates a derivative, through division or multiplication, of the master clock signal for use in its operations such as writing data into its electrically erasable memory, if applicable, and retrieving data from it for transmission back to reader 101. In so doing, synchronized communication is facilitated.

Detector circuit 210, which implements the present invention, is coupled to at least one of receiver electrodes 206 to receive a read signal transmitted by transponder 102. Detector circuit 210 is designed to detect a signal with a carrier frequency of 62.5 kHz. Such a signal is transmitted by transponder 102 when it is activated unless transponder 102 is deactivated or removed. Detection is made only if the amplitude of the received signal reaches a threshold voltage. In the preferred embodiment, the threshold voltage is adjustable to accommodate different operating ranges. When a detection of a signal having a carrier frequency of 62.5 kHz is made, detector circuit 210 signals processor 204 which immediately alerts security personnel. Because an alert is made as soon as a signal having the predetermined carrier frequency is detected and no additional information transfer is required, the operating response is fast. Moreover, the operating range is improved since detector circuit 210 is designed to be sensitive by using a high Q piezoelectric element. Furthermore, the electrostatic RFID system implemented in the present invention is not adversely effected by magnetic fields.

Figure 3:
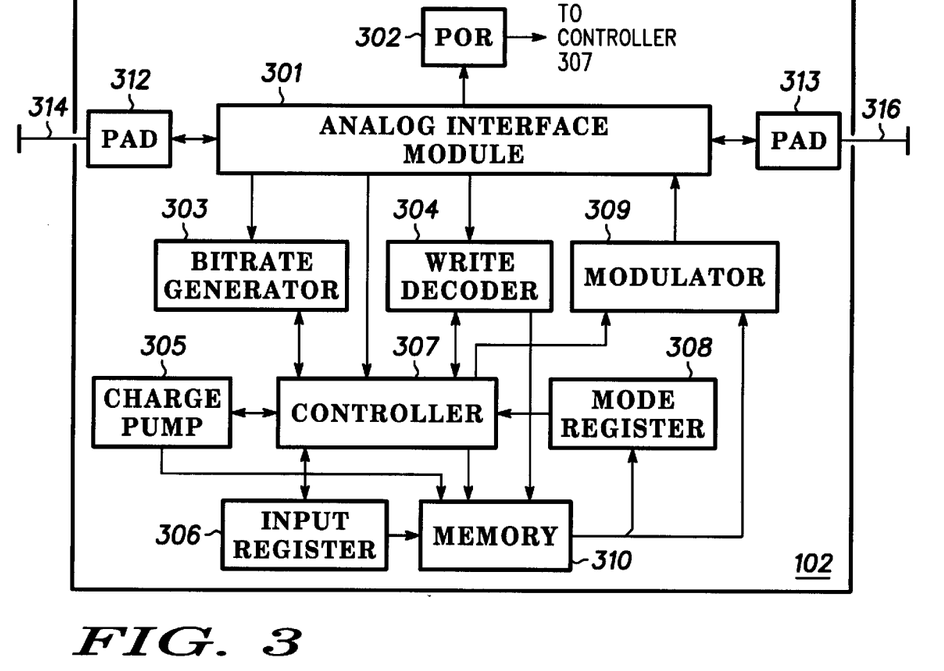
FIG. 3 is a block diagram of the transponder illustrated in FIG. 1.

FIG. 3 is a block diagram of transponder 102. It includes an analog interface module 301, a bitrate generator 303, a write decoder 304, an optional charge pump 305, an input register 306, a controller 307, a mode register 308, a modulator 309, a memory 310, pads 312–313, and electrodes 314 and 316. Transponder 102 is usually implemented on a silicon chip. Electrodes 314 and 316 receive electrostatic exciter signals from reader 101 and send electrostatic read signals back to reader 101. Electrode 314 is coupled to pad 312 and electrode 316 is coupled to pad 313. Analog interface module 301 is coupled to pad 312 and to pad 313. In this manner all signals received or transmitted by transponder 102 pass through analog interface module 301. For optimum electrostatic performance, it is desirable to minimize the parasitic capacitance between electrodes 314 and 316. In one embodiment, the capacitance is kept to 5 pF or less. Internal bypass capacitance is provided in analog interface module 301 to serve as power storage. Pads 312–313 are preferably located at opposite far ends of the silicon chip for optimum assembly to the electrodes.

Controller 307 can deactivate transponder 102 as needed. The deactivation of modulator 309 results in the deactivation of transponder 102 as a whole which is desirable, for example, when authorization is granted to allow a package or merchandise to be removed from a secured area implementing an EAS system. Controller 307 controls the functionality of transponder 102 in conjunction with analog interface module 301. Controller 307 is coupled to nearly all components of transponder 102 except for the electrodes and pads. Memory 310 may be a non-volatile memory such as an EEPROM memory that retains its information when power is cut off. If an EEPROM memory is used, optional charge pump 305 may be required in order to boost the voltage of the transponder power supply in order to write data into the EEPROM memory. Input register 306 temporarily stores information that is to be written into memory 310 because it takes time for charge pump 305 to achieve the required voltage. In any case, storing data into input register 306 allows controller 307 to also process other tasks for transponder 102 while waiting for charge pump 305.

Mode register 308 reads configuration information for transponder 102 from memory 310 and provides this to controller 307. Write decoder 304 analyzes a data sequence being received by transponder 102 and determines whether the transponder can go into a write mode or whether it needs to remain in a read mode. Modulator 309 prepares data read from memory 310 for transmission by transponder 102. Modulator 309 encodes and modulates the data information retrieved from memory 310.

When in proximity of reader 101, transponder 102 first receives the exciter signal. The exciter signal generated by reader 101 has an exciter frequency of 125 kHz. After receiving the exciter signal, the transponder 102 derives a square wave based on the exciter signal at the exciter frequency which is used as a master clock signal for the transponder 102. In so doing transmitted information received by transponder 102 is synchronized with the clock signal. This obviates the need for generating a clock with a duplicate clock oscillator and also the need for synchronizing the data and clock using phase-locked loop techniques.

Bitrate generator 303 receives as input the clock signal having a frequency of 125 kHz from a clock extraction circuit (not shown). The clock extraction circuit derives a clock signal having a frequency of 125 kHz from the exciter signal which serves as a master clock signal for transponder 102. Bitrate generator 303 generates the data transfer rate at which data is transferred from/to memory 310 during a read or write mode, respectively. Bitrate generator 303 derives it's data transfer rate from the exciter frequency of 125 kHz. The data transfer rate is provided to controller 307. In the preferred embodiment, bitrate generator 303 can be programmed to operate at either 125 kHz/16 (7.81 kHz) or 125 kHz/32 (3.91 kHz). Modulator 309 modulates the read data retrieved from memory 310 in Phase Shift Keying (PSK). Modulator 309 also performs attenuated amplitude modulation on the read data. This modulated signal is then passed on to electrodes 314–316 for transmitting to reader 101.

Figure 4:
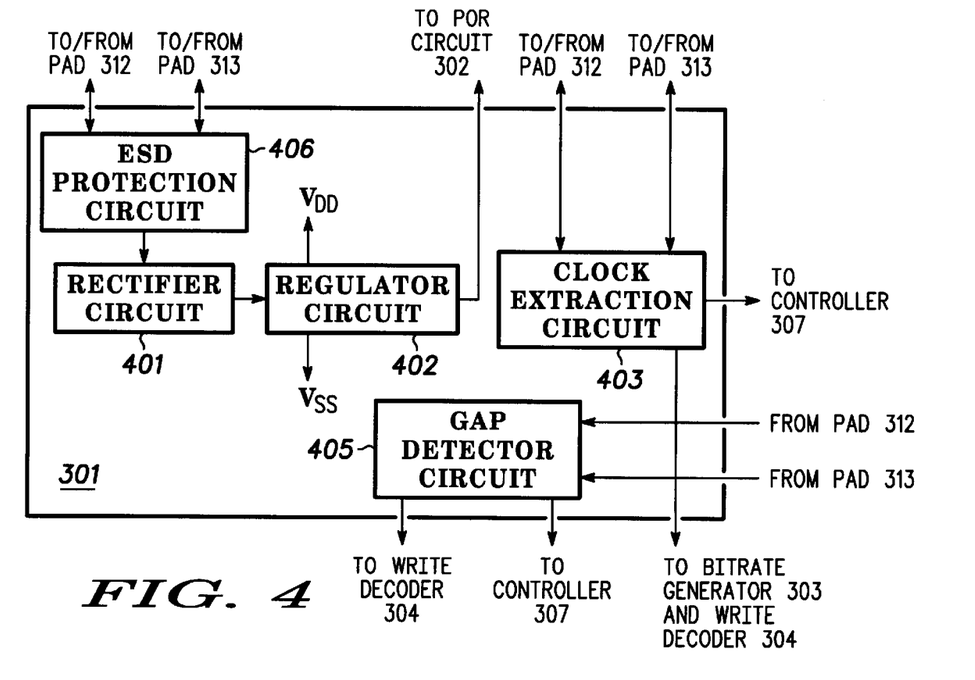
FIG. 4 is a block diagram of the analog interface module in the transponder illustrated in FIG. 2

FIG. 4 is a block diagram of analog interface module 301 which performs multiple functions when receiving and transmitting electrostatic signals in an analog signal form. Analog interface module 301 performs the power supply management function for electrostatic RFID transponder 102. Analog interface module 301 extracts a power signal from a RF exciter signal received from electrodes 314 and 316. Additionally, it performs clock extraction in clock extraction circuit 403 in order to provide a clock signal to the other components of transponder 102. In RDID write mode, analog interface module 301 also receives a data stream from the RF exciter signal. Gap detector 405 of analog interface module and write decoder 304 analyze the receive data stream in order to determine if transponder 102 should perform a read operation or a write operation and communicates the results of the analysis to controller 307.

Figure 5:
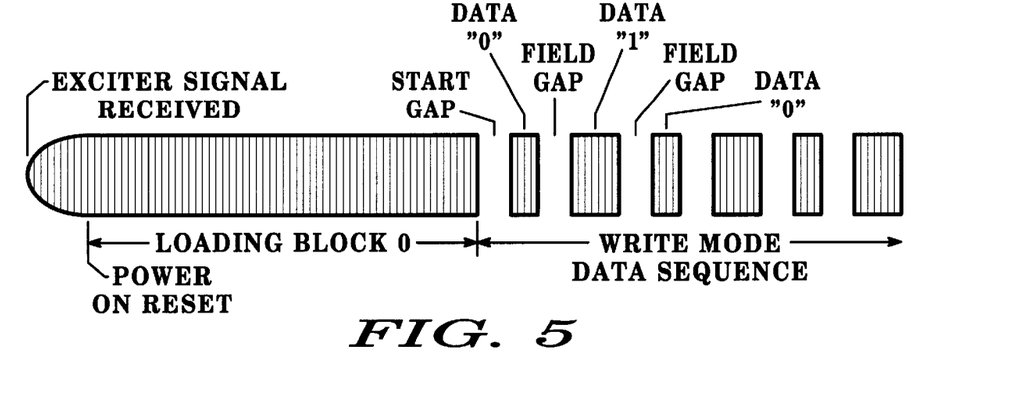
FIG. 5 depicts a signal waveform from the reader illustrated in FIG. 2.

FIG. 5 depicts a waveform W1 sent by exciter 201 to transponder 102. The waveform is controlled and timed by processor 204. The first part is a full-amplitude sinusoid having a carrier frequency F1 of 125 kHz. It is followed by a zero amplitude start gap, which indicates to the transponder 102 that a binary data sequence that is amplitude modulated is to follow. This sequence is composed of an RF pulse stream representing logic zeros and ones, separated by zero amplitude gaps (field gap) between data packets. In transponder 102, exciter frequency F1 is divided by two, resulting in a transponder carrier frequency F2 of 62.5 kHz for modulation back to the reader 101. It should be clear to a person of ordinary skill in the art that F2 can be derived from exciter frequency F1 through either division (in which case F2<F1) or multiplication (in which case F2>F1).

Figure 6:
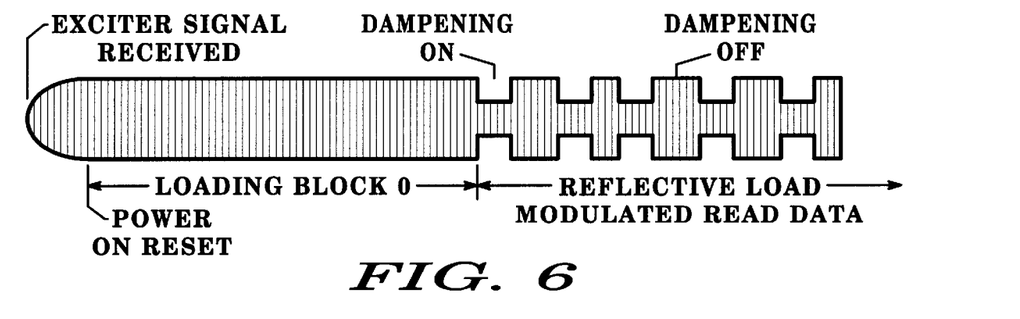
FIG. 6 depicts a signal waveform from the transponder illustrated in FIG. 3.

FIG. 6 illustrates a waveform W2 with a carrier frequency F2 of 62.5 kHz. This frequency is amplitude modulated by modulator 309 to represent the data sequence retrieved from memory 310 for transmission back to reader 101 via electrodes 314 and 316.

Figure 7A:
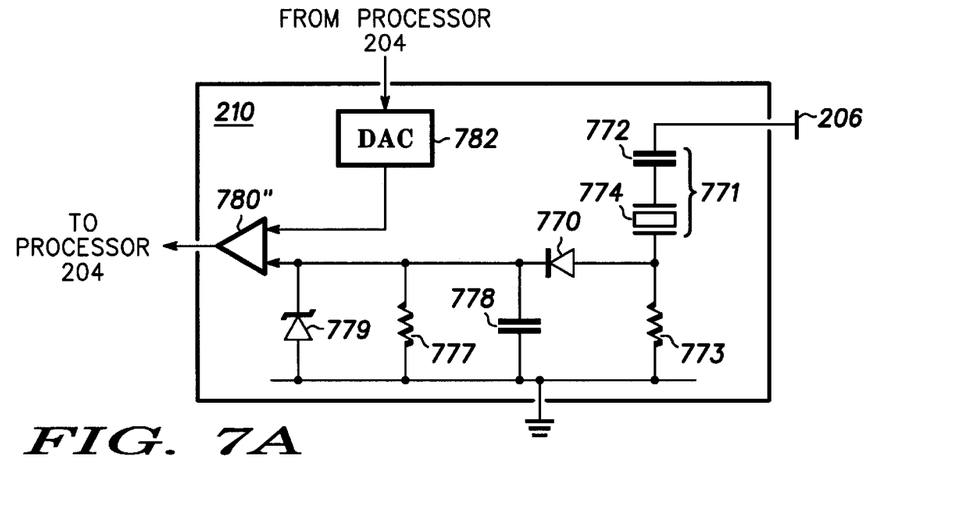
FIG. 7A is a diagram of the detector circuit illustrated in FIG. 2 using a series resonance circuit.

FIG. 7A shows an embodiment of detector circuit 210 which comprises resonator circuit 771, resistor 773, diode 770, capacitor 778, bleed resistor 777, zener diode 779, comparator 780 and a DAC (digital-to-analog converter) 782 connected to processor 204. Resonator circuit 771 consists of capacitor 772 and piezoelectric element 774 with a high Q factor connected in series for operating in a series resonant mode. One terminal of capacitor 772 is connected to receiver electrode 206 and one terminal of piezoelectric element 774 is connected to grounded resistor 773. Piezoelectric element 774 is also connected to diode 770. Piezoelectric element 774 may be a piezoelectric quartz crystal, a piezoelectric lithium niobate crystal, a piezoelectric ceramic resonator, or other piezoelectric materials.

When an alarm signal is received at receiver electrode 206, it passes through capacitor 772 and piezoelectric element 774. When the signal frequency is outside of its resonant frequency, the impedance across resonator circuit 771 is large and the voltage developed across resistor 773 is minimal. However, at the resonant frequency, which is 62.5 kHz in the preferred embodiment, the impedance across resonator circuit 771 is at a minimum thus maximizing the voltage across resistor 773. Resonator circuit 771 is capable of having Quality factors, Q's, in the 10,000's at the resonant frequency which results in substantial improvement in sensitivity thereby enhancing detection of EAS or RFID/EAS articles.

In particular, diode 770 rectifies the detected voltage signal by passing only positive half cycles of the signal to grounded capacitor 778 which acts as a storage device. By itself, capacitor 778 serves as a peak detector for the rectified voltage signal generated by diode 770. However, when bleed resistor 777 is used in combination with capacitor 778, they act as an envelope detector circuit to track the rectified voltage signal and to reset the circuit when the signal goes to zero. The envelope detector circuit generates an envelope detector signal. Zener diode 779 is used to govern the envelope detector signal to a desirable level. Comparator 780 compares the envelope detector signal against a threshold signal Vth. If the envelope detector circuit reaches the threshold voltage, comparator 780 changes its logic state to initiate an alarm condition. In so doing, detector circuit 210 provides sensitive and adjustable detection of any signal having a predetermined carrier frequency, such as 62.5 kHz, from transponder 102. In the preferred embodiment, voltage signal Vth is generated by DAC 782 under software control by processor 204. As such, the detection range can be adjusted by varying, for example, the threshold voltage Vth. Because detector circuit 210 immediately indicates to processor 204 when a threshold voltage is reached with no data transfer required, the responsiveness is quick. Alternatively, voltage signal Vth can be supplied by any variable voltage source. It is to be appreciated that, in accordance to the present invention, the first carrier frequency for exciter signals from exciter 201 and the second carrier frequency for a read signal from transponder 102 are to be different. In an alternative embodiment, detector circuit 210 may further include an operational amplifier and a plurality of diodes in a full wave rectifier configuration coupled between resistor 773 and diode 770. In another alternative embodiment, detector circuit 210 may employ a phase-locked loop circuit in place of piezoelectric element 774 and capacitor 772. It should be understood to one familiar in the art that the order of capacitor 772 and piezoelectric element 774 within resonator circuit 771 may be reversed.

Figure 7B:
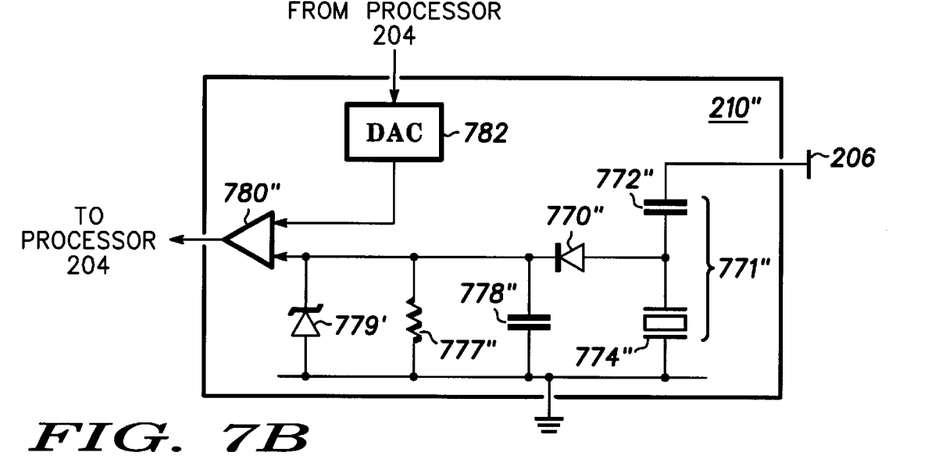
FIG. 7B is a diagram of an alternate detector circuit illustrated in FIG. 2 using a series resonant circuit.

FIG. 7B shows an alternate embodiment of detector circuit 210". As shown in FIG. 7B, the elements of detector circuit 210" have double-primed reference numbers to make them more identifiable with their corresponding counterparts in FIG. 7A. The connections between capacitor 778", resistor 777", zener diode 779", and comparator 780" are similar to that described in FIG. 7A. However, in FIG. 7B, diode 770" is connected between piezoelectric element 774" and capacitor 772". The functions of the elements in detector circuit 210" (FIG. 7B) are substantially similar to that of the elements in detector circuit 210 (FIG. 7A) and are not further discussed. It should be understood to one familiar in the art that the order of capacitor 772" and piezoelectric element 774" within resonator circuit 771" may be reversed.

Figure 8:
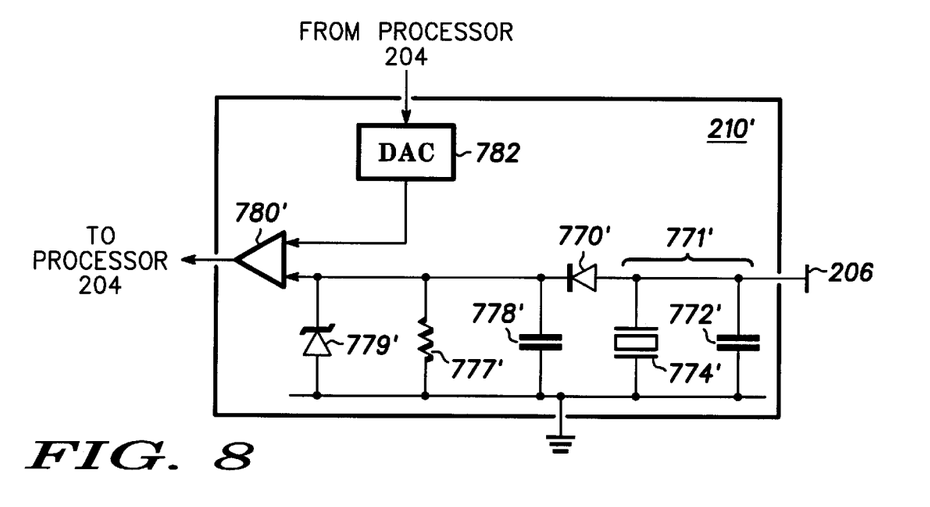
FIG. 8 is a diagram of the detector circuit illustrated in FIG. 2 using a parallel resonance circuit.

FIG. 8 shows yet another alternate embodiment of detector circuit 210'. As shown in FIG. 8, the elements of detector circuit 210' have primed reference numbers to make them more identifiable with their corresponding counterparts in FIG. 7A. The connections between capacitor 778', resistor 777', zener diode 779', and comparator 780' are similar to that described in FIG. 7A. However, in FIG. 8, grounded capacitor 772' and piezoelectric element 774' are connected in parallel to electrode 206' and to diode 770'. The functions of the elements in detector circuit 210' (FIG. 8) are substantially similar to that of the elements in detector circuit 210 (FIG. 7A) and are not further discussed.

Figure 9:
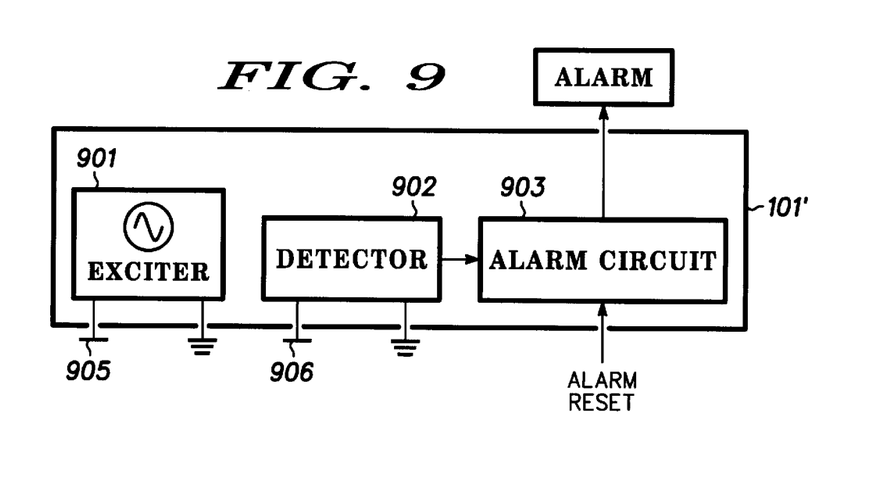
FIG. 9 is a block diagram of an electrostatic EAS reader implementing the present invention.

The above discussion describes the first embodiment of the present invention, a combined electrostatic RFID/EAS reader. The second embodiment of the present invention involves an electrostatic EAS reader and is described next. Reference is now made to FIG. 9 illustrating electrostatic EAS reader 101'. As shown in FIG. 9, electrostatic EAS reader 101' comprises exciter 901, detector circuit 902, alarm circuit 903, exciter electrode 905, and receiver electrode 906. Exciter electrode 905 is coupled to exciter 901. Receiver electrode 906 is coupled to detector circuit 902. Operationally, exciter 901 generates a RF exciter signal for activating an electrostatic transponder. Basically, the RF exciter signal provides operating power to the electrostatic transponder in the form of electrostatic (electric) energy. In addition, the carrier frequency of the RF exciter signal provides clock information for the electrostatic transponder. In the preferred embodiment, the electrostatic RF exciter signal has a carrier frequency of 125 kHz. The electrostatic RF exciter signal is transmitted to the electrostatic transponder through exciter electrode 905. In response, the electrostatic transponder sends back a RF alarm signal to indicate that the article may not be removed without authorization.

Detector circuit 902 implements the present invention. Detector circuit 902 can employ either the embodiment described above in FIG. 7A, the embodiment described above in FIG. 7B, or the embodiment described above in FIG. 8. For brevity and clarity, these descriptions are not repeated. In general, detector circuit 902 detects an electrostatic RF alarm signal from electrostatic EAS transponder 102' via receiver electrode 906, detector circuit 902. Detector circuit 902 is designed to detect an alarm signal with a carrier frequency of 62.5 kHz. Detection is made only if the amplitude of the received signal reaches a threshold voltage. In the preferred embodiment, the threshold voltage is adjustable to accommodate different operating ranges. When a detection of the alarm signal having a carrier frequency of 62.5 kHz is made, detector circuit 902 sends the RF alarm signal to alarm circuit 903. Alarm circuit 903 generates the proper signal to drive the desired alarm type (e.g., audio, visual, etc.) to indicate that an article is being removed without authorization. Alarm circuit 903 has an alarm reset signal to deassert the drive signal when the alarm is to be deactivated. The alarm reset may be automatic (not shown) or manual, as shown. Because an alert is made as soon as a signal having the predetermined carrier frequency is detected and no additional information transfer is required, the operating response is fast. Moreover, the operating range is improved since detector circuit 902 is designed to be sensitive by using a high Q piezoelectric element. It should be known to one skilled in the art that detection of an RFID/EAS transponder is similarly achieved.

Two embodiments of the present invention are thus described. The first embodiment involves a combined RFID/EAS reader. The RFID/EAS reader has a detector circuit that uses a high sensitivity or high 'Q' circuit to detect the carrier frequency of interest in response to an alarm signal from a transponder. In addition, the RFID/EAS reader has a receiver to read the contents of the RFID transponder and an transmitter to write to the RFID/EAS transponder. The second embodiment involves an electrostatic EAS reader. The EAS reader also implements the same high sensitivity or high 'Q' circuit to detect the carrier frequency of interest in response to an alarm signal from a transponder. However, it does not contain a reader to read the RFID contents.

Advantages of the present invention are its low costs, ease of manufacturability, and packaging flexibility. Another advantage of the present invention is improved sensitivity in detecting an EAS alarm signal. Another advantage of present advantage is the ability to detect either EAS or RFID/EAS transponders. Yet another advantage of the present invention is improved operating range without violating FCC regulations and EMI regulations. While the present invention has been described in particular embodiments, the present invention should not be construed as limited by such embodiments, but rather construed according to the below claims.

What is claimed is:

1. A reader comprising:
   a processor coupled to a host computer;
   at least a first electrode;
   an exciter, coupled to the processor and at least the first electrode, for generating and transmitting an electrostatic excitation signal having a first carrier frequency;
   at least a second electrode;
   a receiver, coupled to at least the second electrode, for receiving an RF signal via electrostatic means; and
   a detector circuit, coupled to at least the second electrode, for detecting an alarm signal having a second carrier frequency, the detector circuit amplifying the alarm signal if the second carrier frequency is sensed.

2. The reader of claim 1 wherein the exciter is a piezoelectric element.

3. A reader comprising:
   a processor coupled to a host computer storing a database;
   at least a first electrode;
   an exciter coupled to the processor and at least the first electrode, the exciter generating and transmitting an exciter signal having a first carrier frequency over at least the first electrode;
   at least a second electrode;
   a receiver coupled to at least the second electrode, the receiver receiving a RF signal, the receiver demodulating the RF signal and passing it to the processor; and
   a detector circuit coupled to at least the second electrode for detecting an alarm signal having a second carrier frequency, the detector circuit amplifying the alarm signal if the second carrier frequency is sensed, wherein the detector circuit comprises:
      a resonator circuit comprising a piezoelectric element having a high Q factor, the piezoelectric element coupled to the at least one second electrode, the piezoelectric element passively amplifying the alarm signal detected across at least the second electrode at resonant frequency;
      an envelope detector coupled to the piezoelectric element, the envelope detector generating an envelope detector signal in response to the alarm signal; and
      a comparator receiving as inputs the envelope detector signal and a threshold signal, the comparator generating a signal when the envelope detector signal reaches the threshold signal.

4. The reader of claim 3, wherein the detector circuit further comprises a voltage source coupled to the comparator for generating the threshold signal.

5. The reader of claim 4, wherein the voltage source comprises a digital-to-analog converter (DAC) coupled to the comparator, the DAC generating the threshold signal under control of the processor.

6. The reader claim 4, wherein the detector circuit further comprises a zener diode coupled in parallel to a second capacitor for governing the envelope detector signal to a desirable level.

7. The reader claim 6, wherein the detector circuit further comprises an operational amplifier coupled to a plurality of diodes and the piezoelectric element.

8. The reader of claim 3, wherein the piezoelectric element comprises a piezoelectric ceramic resonator.

9. The reader of claim 3, wherein the piezoelectric element comprises a piezoelectric quartz crystal.

10. The reader of claim 3, wherein the piezoelectric element comprises a piezoelectric lithium niobate crystal.

11. The reader of claim 3, wherein the detector circuit comprises a phase-locked loop circuit.

12. A system comprising a reader and a plurality of transponders,
the reader comprising:
a processor coupled to a host computer;
at least one first electrode;
an exciter coupled to the processor and the at least one first electrode, the exciter generating and transmitting an exciter signal having a first carrier frequency over the at least one first electrode;
at least one second electrode;
a receiver coupled to the at least one second electrode, the receiver receiving a RF signal, the receiver demodulating the RF signal and passing it to the processor; and
a detector circuit coupled to the at least one second electrode for detecting an alarm signal having a second carrier frequency, the detector circuit amplifying the alarm signal if the second carrier frequency is sensed;
each one of the plurality of transponders comprising:
a third plurality of electrodes for receiving the exciter signal and transmitting the alarm signal;
an analog interface module coupled to the third plurality of electrodes, the analog interface module extracting a power signal and a clock signal having a first carrier frequency from an RF exciter signal received by the third plurality of electrodes, the analog interface module rectifying and regulating the exciter signal for use in activating the electrostatic transponder;
a memory for storing data;
a modulator coupled to the memory, the modulator modulating data information stored in the memory with a second carrier frequency; and
a controller coupled to the analog interface module and the memory, if a RFID mode is involved, the controller reading data information from the memory and sending the data information to the analog interface module for transmitting over the third plurality of electrodes, if a EAS mode is involved, the controller sending the alarm signal to the analog interface module for sending over the third plurality of electrodes.

13. A reader comprising:
at least a first electrode;
an exciter, coupled to at least the first electrode, for generating and transmitting an electrostatic exciter signal having a first carrier frequency;
at least a second electrode; and
a detector circuit, coupled to at least the second electrode, for detecting an alarm signal having a second carrier frequency,
wherein at least one of the exciter and the detector circuit comprises a piezoelectric element.

14. The reader of claim 13, wherein the detector circuit comprises a phase-locked loop circuit.

15. The reader of claim 13 wherein the detector circuit comprises a piezoelectric element.

16. A reader comprising:
at least a first electrode;
an exciter coupled to at least the first electrode, the exciter generating and transmitting an exciter signal having a first carrier frequency over at least the first electrode;
at least a second electrode; and
a detector circuit coupled to at least the second electrode, the detector circuit detecting an alarm signal having a second carrier frequency, the detector circuit amplifying the alarm signal if the second carrier frequency is sensed, wherein the detector circuit comprises:
a resonator circuit comprising a piezoelectric element having a high Q factor, the piezoelectric element coupled to at least the second electrode; the piezoelectric element passively amplifying the alarm signal detected across at least the second electrode at resonant frequency;
an envelope detector coupled to the piezoelectric element, the envelope detector generating an envelope detector signal; and
a comparator receiving as inputs the envelope detector signal and a threshold signal, the comparator generating a signal when the envelope detector signal reaches the threshold signal.

17. The reader of claim 16, wherein the detector circuit further comprises a voltage source coupled to the comparator for generating the threshold signal.

18. The reader of claim 17, wherein the voltage source comprises a variable voltage source.

19. The reader claim 17, wherein the detector circuit further comprises a zener diode coupled in parallel to a second capacitor for governing the envelope detector signal to a desirable level.

20. The reader of claim 19, wherein the detector circuit further comprises an operational amplifier coupled to a plurality of diodes and the piezoelectric element.

21. A method comprising the steps of:
a) receiving a radio frequency signal via electrostatic means;
b) detecting a carrier frequency for the radio frequency signal using a piezoelectric element;
c) rectifying the radio frequency signal, when the carrier frequency is sensed, to generate a rectified signal;
d) generating a detector signal by tracking the rectified signal;
e) generating a threshold signal;
f) comparing the detector signal to the threshold signal; and
g) generating an alarm signal when the detector signal reaches the threshold signal.

22. The method of claim 21, further comprising the step of passively amplifying the alarm signal at resonant frequency using an piezoelectric element.

23. The method of claim 21, wherein the step of detecting a carrier frequency is performing via a phase-locked loop circuit.

\* \* \* \* \*